UNITED STATES PATENT OFFICE.

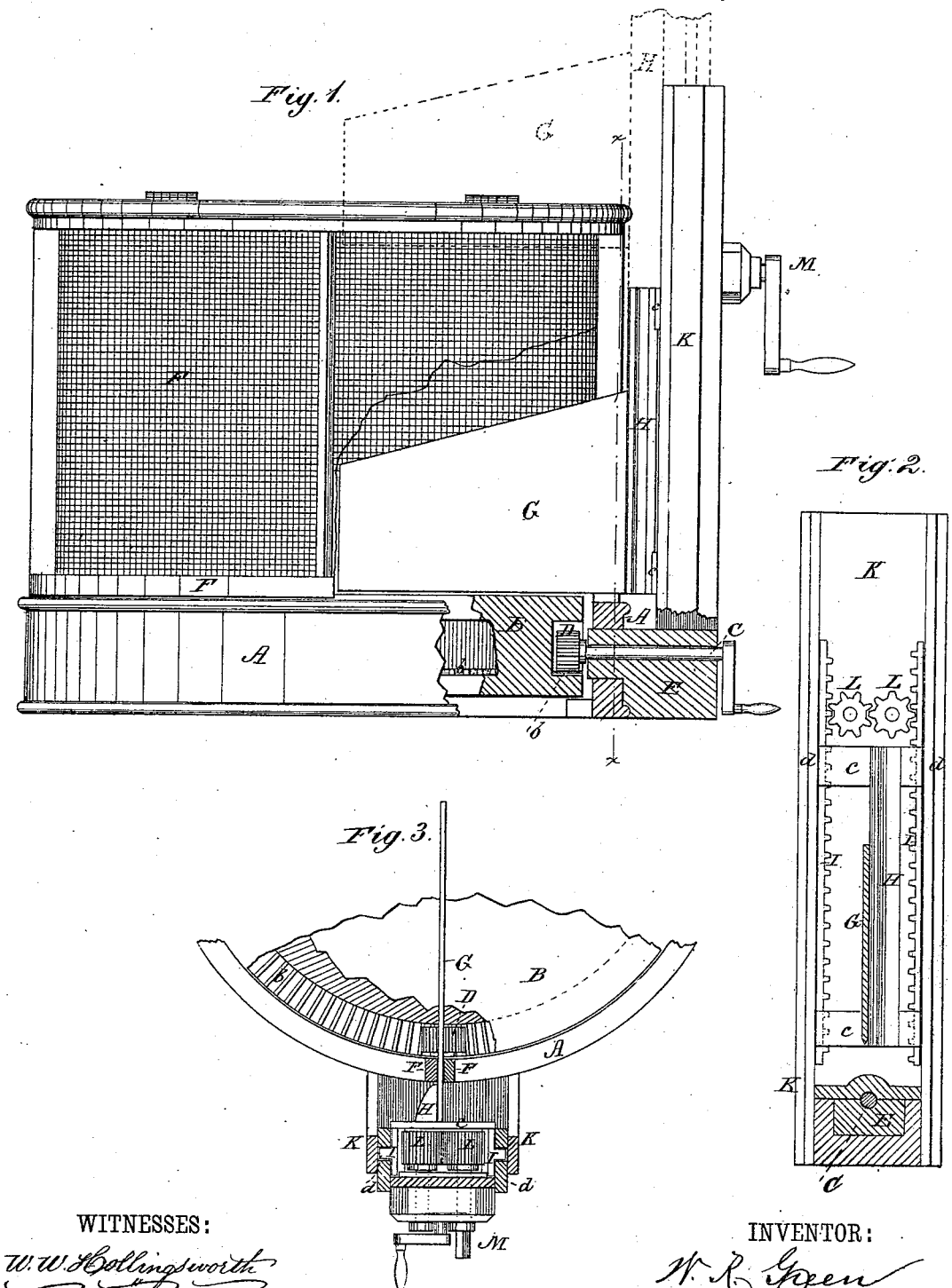

WALTER R. GREEN, OF SALT LAKE, UTAH TERRITORY.

CHEESE-CUTTER.

SPECIFICATION forming part of Letters Patent No. 226,513, dated April 13, 1880.

Application filed January 2, 1880.

*To all whom it may concern:*

Be it known that I, WALTER R. GREEN, of the city and county of Salt Lake, Utah, have invented a new and Improved Cheese-Cutter; and I do hereby declare that the following is a full, clear, and exact description of the same.

My invention is an improvement in the class of cheese-cutters having a rotary table or platform and vertically-operating slicer or knife.

The improvement consists in the construction and arrangement of parts whereby the rotating table or platform on which the cheese is placed is supported at the edge, instead of centrally, by means of a pivot, and thereby rendered more firm and steady both when at rest and in motion.

The construction is such that the horizontally-projecting ledge of the platform rests on a portion of the annular base of the machine, and is provided with teeth on its upper side to form a rack, with which the pinion of a crank-shaft engages for the purpose of rotating the platform.

In accompanying drawings, forming part of this specification, Figure 1 is mainly a side elevation, a portion being broken away. Fig. 2 is a vertical section on line $x$ $x$, Fig. 1. Fig. 3 is a horizontal section of a portion of the machine.

The base A of the machine has an annular form and the circular platform B, on which the cheese is placed, a little higher than the upper edge of the base. Said platform B has a circular rack, $b$, attached to its lower side and projecting from its edge.

A crank-shaft, C, carrying on its inner end a pinion, D, is arranged horizontally in an abutment or block, E, attached to the outer side of base A. The pinion D meshes with rack $b$.

By rotating the crank-shaft it is obvious the platform will be rotated also, and thus the cheese placed thereon may be turned as required for cutting pieces or slices of any required size.

The gauze-wire cheese cover or protector F is made in two equal parts, one of which is fixed on the base A, and the other hinged to adapt it to be raised for gaining access to the cheese.

The sliding knife or cutter G is moved in a vertical plane and arranged radially to the platform B, so as to work in contact with or parallel to one of the vertical sides of the fixed part of the cover F. Said cutter is attached to a bar, H, having arms $c$ at each end, which are attached to racks I I, that are placed parallel, with their toothed sides opposite, and slide in vertical grooved guides or ways $d$, formed in the recessed standard K. The latter is fixed on the block or abutment E. Thus the knife G, bar H, and racks I are rigidly connected and operated together vertically as one device.

The means for imparting movement to the same are two pinions, L L, which have their bearings in the standard K, and mesh with each other and the racks I, respectively, so that when one of the pinions is rotated by its crank M the other will be rotated in the opposite direction, and thus the pinions being fixed in position, and the racks I and cutter G being movable, the latter travel upward or downward, according to the direction of rotation of crank M.

The standard K constitutes a firm support and guide for the racks I, so that the former is made comparatively short, and the racks project above it when the cutter G is raised as high as required to begin a cut.

The proportions of the pinions L are designed to be such that three or four turns of the crank M will carry the knife G down through the cheese, and hence the same may be sliced quickly.

The construction of the operating parts is such that they are strong, not liable to get out of order, are easily accessible, and occupy small space.

What I claim is—

The rotating cheese-supporting platform having a flange projecting horizontally from its side and provided with teeth on its upper side to form a rack, $b$, in combination with the circular base having inwardly-projecting lugs, on which said platform-flange rests, and a shaft and pinion for operating the platform, as specified.

WALTER ROBERT GREEN.

Witnesses:
 J. G. EVANS,
 JAMES F. LEES.